(12) United States Patent
Le et al.

(10) Patent No.:   US 12,580,788 B2
(45) Date of Patent:      Mar. 17, 2026

(54) TECHNOLOGIES FOR STABLE HOME LOCATION

(71) Applicant: APPLE INC., Cupertino, CA (US)

(72) Inventors: Hung Q. Le, San Diego, CA (US); Alexander Merolla, Cupertino, CA (US); Wayne A. Lee, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 168 days.

(21) Appl. No.: 18/388,988

(22) Filed: Nov. 13, 2023

(65) Prior Publication Data

US 2024/0275629 A1      Aug. 15, 2024

Related U.S. Application Data

(60) Provisional application No. 63/445,263, filed on Feb. 13, 2023.

(51) Int. Cl.
  H04L 12/28          (2006.01)
(52) U.S. Cl.
  CPC ...... H04L 12/2827 (2013.01); H04L 12/2807 (2013.01)
(58) Field of Classification Search
  CPC ........................ H04L 12/2807; H04L 12/2827
  See application file for complete search history.

(56) References Cited

U.S. PATENT DOCUMENTS

| | | | |
|---|---|---|---|
| 8,326,326 B2 * | 12/2012 | Li | G01S 5/0018 |
| | | | 455/456.2 |
| 9,819,627 B2 * | 11/2017 | Cao | H04L 51/222 |
| 9,946,857 B2 * | 4/2018 | Beals | G06F 21/32 |
| 11,086,952 B2 * | 8/2021 | Kim | G06F 16/9537 |
| 11,265,379 B2 * | 3/2022 | Shim | H04L 67/12 |
| 11,354,089 B2 * | 6/2022 | Nicolich-Henkin | |
| | | | H04L 12/2827 |
| 11,394,572 B2 * | 7/2022 | Pognant | H04L 12/2809 |
| 11,818,584 B2 * | 11/2023 | Smith | H04W 12/50 |
| 2024/0275629 A1 * | 8/2024 | Le | H04L 12/282 |

* cited by examiner

*Primary Examiner* — G. C. Neurauter, Jr.
(74) *Attorney, Agent, or Firm* — BAKERHOSTETLER; Kyle B. Morse

(57)           ABSTRACT

The present application relates to devices and components, including apparatus, systems, and techniques updating the home location of a home automation system. The user device is associated with a home automation system that is configured at a home or office. The user device may be in a location other than the primary location associated with the home automation system. The user device may send a message to update the location of the home automation system. The transmission of the update message is restricted to be sent using a specific technology, e.g., using Wi-Fi®.

20 Claims, 6 Drawing Sheets

300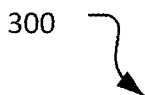

Detecting, by a user device, a first connection of the user device to a first local network 304

Detecting, by the user device, a plurality of devices connected to the first local network, the user device and the plurality of devices being communicatively coupled at least in part through the first local network 308

Configuring, by the user device, a primary location based at least in part on first location information 312

Detecting, by the user device, a second connection of the user device to a second local network 316

Detecting, by the user device, that a first device of the plurality of devices previously connected to the first local network is connected to the second local network 320

Initiating, by the user device, a process to update the primary location based at least in part on second location information 324

Restricting, by the user device, transmission of a primary location update message to a second device of the plurality of devices through the second local network 328

Determine, by the user device, that the first local network is different than the second local network 404

Enable, by the user device, said initiating based at least in part on the first local network being different from the second local network 408

500

TECHNOLOGIES FOR STABLE HOME LOCATION

CROSS-REFERENCES TO OTHER APPLICATIONS

This application claims priority to U.S. Provisional Application No. 63/445,263 for "TECHNOLOGIES FOR STABLE HOME LOCATION" filed on Feb. 13, 2023, which is herein incorporated by reference in its entirety for all purposes.

TECHNICAL FIELD

This application generally relates to smart home systems and, in particular, technologies for detecting a controller device's location.

BACKGROUND

A home automation system allows users to control devices' operation at predefined home locations. Location-based services (e.g., geo-services) can be configured to use a user's device location relative to the predefined home location to perform home automation routines, such as turning the lights on or off. For example, the system can detect when the user device leaves the predefine home location to turn off the preselected set of lights in the home location. Likewise, when the home automation system detects the user device has returned to the predefined home location, it may turn on the preselected set of lights. A correct home location is desired for the operation of the home automation system.

BRIEF DESCRIPTION OF THE DRAWINGS

The following description includes discussion of figures having illustrations given by way of examples of implementations. The drawings should be understood by way of example and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention and do not necessarily all refer to the same implementation. However, they are also not necessarily mutually exclusive.

FIG. 3 illustrates an operational flow/algorithmic structure in accordance with some embodiments

DETAILED DESCRIPTION

Figure 1:
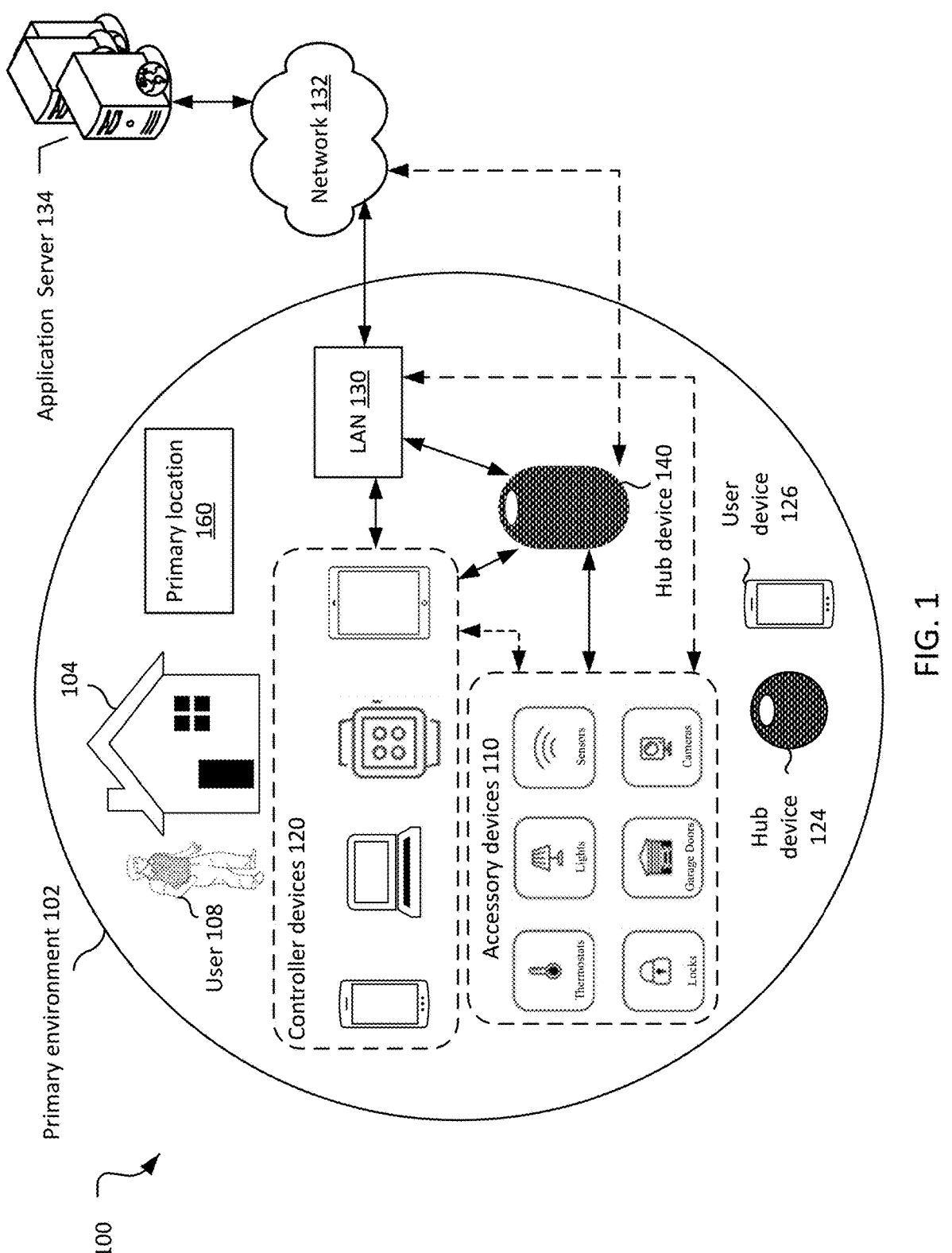
FIG. 1 illustrates a block diagram in accordance with some embodiments

For the purposes of the present document, the phrase "A or B" means (A), (B), or (A and B), and the phrase "based on A" means "based at least in part on A," for example, it could be "based solely on A," or it could be "based in part on A."

A user may use their device to set up a home automation system. Accessory devices, such as sensors, actuators, lights, etc., can be installed to collect data and perform tasks, e.g., sensors for measuring light or humidity and actuators for opening or closing the garage door. Controller devices may be used to control accessories and may also collect and analyze data, configure accessory devices, and perform automation routines. A local area network (LAN) may provide connectivity among the sensors and controllers within a geographic region, such as a home, office, park, etc. A distributed algorithm that runs on all the devices may select a controller device as the primary controller. The primary controller may also be called a resident device, a home hub, or a hub device. In some examples, a resident device is a controller configured to not regularly be moved (e.g., it may reside within a home or particular LAN). The primary device can be used to set and/or manage the physical address or location of the user device that sets up the system at the time of setup as the primary location or home location of the home automation system. For example, the primary device may extract the physical location from the properties of the LAN or from a user device (e.g., another controller, which may be a mobile device, such as a cellular/smartphone).

The primary device may also be connected to another network, e.g., the Internet or cloud computing infrastructure, through the LAN or a separate connection. The primary device may store the home automation system's primary or home location in the cloud storage. A cloud-based application may also provide analytics and operational support to the automation system through the primary device.

The primary device detects the user's device (e.g., the user's phone) disconnection from the local area network of the home automation system. The primary device may interpret the user's device disconnection as the user leaving the home location (interpreting the user's device location as a proxy to the user's location). Similarly, the primary device can detect the user's device reconnection to the local area network and may interpret it as the user returning to the home location. The user's device's location may also be determined based on geolocation information received from the user's device (e.g., it may not have anything to do with the connection to the LAN). The user's device may inform its location to the primary device, particularly when the user's device detects a device from the home automation system or the LAN.

For example, home automation may include lights in a home as accessories and a user's smart streaming media device as a controller device. The user may use voice commands to turn the lights on or off through the streaming media device. The streaming media device may be the primary controller and automate the turning lights on and off based on whether the user (e.g., the user's device) is home or based on other settings such as time or the like.

A controller device may be multi-functional. For example, a user may use a hub device for entertainment, e.g., a tablet device or smart television controller device. Thus, it is possible that the user may take a hub device with them when traveling, e.g., to seamlessly continue using their streaming services even when not at home.

For example, a user may take a smart media streaming device when going on vacation to stream music. The user may unplug the controller and pack the controller, and leave town. When reaching the destination, e.g., at a hotel, the user may plug in the controller and connect the controller and the user device to a new local network, e.g., a Wi-Fi® network. The user device and the controller may also connect through proprietary or other connectivity technologies such as Bluetooth® or Zigbee®, to name a few. The user device may have a list of devices such as controllers and accessories of the home automation system. Then, through discovery or a handshake process, the user device may receive the identity of the controller device. For example, the user device and the controller may be previously paired, e.g., via a Bluetooth® connection.

When the home, e.g., the home automation system, is set up (e.g., as each device is added), each device that is added may be included in a "home" architecture/model that includes info about each device and what "room" or "zone" it was added to (this is all configurable by the user). That model may be stored in the user's cloud storage (a server-side account). So, each device may store the list locally or pull it from the cloud when needed. The user device may determine that the controller device belongs to the home automation system and may interpret the discovery of the controller as being at the primary or home location. The user device may send a message through the Wi-Fi® connection and the Internet to the primary or resident device to update the home location with its current location. If the primary location information is successfully updated with the user's current location, the home automation system may not operate properly. For example, the physical location of the home system might be in one continent, and the user's current location while traveling in another continent. Home automation that turns on and off based on the time zone of the primary home location may turn on and off the lights based on the time zone of the user's device and not the time zone of the user's home physical location. Various other errors, not related to the new location, may also be created at home for the devices still there.

FIG. 1 illustrates a block diagram 100 in accordance with some embodiments. Block diagram 100 is an example of a home automation system, including the primary environment 102. The primary environment 102 includes the home automation devices and has properties and characteristics, such as physical location (primary location) and geofence boundaries. The home automation system may be connected to the application server through the network 132.

The primary environment 102 may also be called the home or office environment and may correspond to an area or structure, e.g., the structure 104. Structure 104 may be a dwelling unit or an office environment. In addition, a user may be affiliated with the primary environment 102, e.g., living or working in the primary environment 102. For example, the user 108 may live in the structure 104. The user 108 may have a profile or an account. The profile may store information and settings associated with the user 108. For example, the user profile contains the information used to identify the user 108. The user profile may be associated with the primary environment 102. For example, the profile may include the primary location 160 of the primary environment 102. There may be more than one user, each with a profile affiliated with the primary environment 102. The profile of the user 108 may also be affiliated with one or more user devices, e.g., the user device 126. The user device 126 may be a smartwatch, a mobile phone, or a tablet.

The user 108 may use the user device 126 to set up a home automation system at the primary environment 102. The setup and configuration of the home automation system may include registering and creating a software platform and application, adding devices, e.g., associating devices with the software platform and the application, and configuring and connecting devices to the LAN 130. The home automation system may include the controller devices 120, the accessory devices 110, and the LAN 130.

The LAN 130 provides connectivity among the controller 120 and accessory 110 devices. The LAN 130 may include all subsystems such as access points, routers, repeaters, and controllers required to establish a wired, wireless, or a combination of wired and wireless local area networks. The controller devices 120 or accessory devices 110 may automatically or with the intervention of the user 108, the user device 126, or the hub device 140 connect to the LAN 130.

In some instances, a controller device may reside within the home environment, e.g., the hub device 140. The hub device 140, may also be called a resident device, may be accessible from outside of the primary environment 102 through the network 132. The hub device 140 may be communicatively coupled with devices inside the primary environment 102 through LAN 130. The hub device 140 may connect to the network 132 directly or indirectly through the LAN 130. The hub device 140 may be a hub device with similar functionality as hub device 124.

The controller devices 120 may be communicatively coupled or connected to one or more accessory devices 110. The accessories are placed in primary environment 102 to collect information or perform tasks. In some embodiments, an accessory device may receive instructions or be controlled by a controller device. In some embodiments, the accessory device may directly communicate with the controller device (or one or more other devices of the home environment 102) over the LAN without using a router as an intermediary device.

For example, accessory devices 110 may include thermostats, light switches or light bulbs, humidity sensors, locks, garage door sensors and actuators, and cameras, among others. The software platform and the applications of the home automation system analyze the data and perform automation tasks through the controllers and accessories. For example, each controller may be connected to one or more accessories, e.g., a controller may be connected to cameras and receives images (e.g., video frames) from them. The home automation application and software may analyze the images to determine persons and objects in the images and notify the user 108 via a speaker accessory or take other actions. The software platform may be installed or executed by the controller device connected to the accessory or distributed among the devices 110 or 120, network 132, or application server 134.

The devices 110 or 120 may connect directly or through the LAN 130 to network 132, e.g., a wide area network (WAN) or the Internet. The network 132 may correspond to any suitable WAN that extends over a wide geographic area. Although, as described herein, network 132 may typically correspond to the Internet, embodiments should not be construed to be so limited. For example, consider a scenario in which primary environment 102 corresponds to an apartment. The apartment may be one of several apartments on a campus spread over a wide area (e.g., across several campuses in a city, a country, etc.). The network 132 may correspond to a private WAN connecting campus devices.

The application server 134 may be any suitable server computer. In some embodiments, the application server 134 may be accessible via a WAN (e.g., the Internet). The application server 134 may include the hardware component such as computer, storage, memory, and controllers, as well as the software component such as drivers, firmware, and application software.

In some embodiments, the application server 134 can be a large mainframe, a minicomputer cluster, or a group of servers functioning as a unit (e.g., as part of a cloud computing platform connected to the WAN). In one example, the server device 134 may comprise one or more computational apparatuses. It may use various computing structures, arrangements, and compilations for servicing requests from one or more client computers.

The application server 134 may receive and store data and information or perform analytics on past and present data. For example, the application server 134 may execute a reachability detection service or may execute face or voice recognition algorithms.

The application server 134 may receive (e.g., from the devices 110 or 120) or maintain a list of user devices or user profiles. For example, the server device may maintain a list of user profiles of users associated with the primary environment 102 or controller 120, accessory 110, hub 124, user 126, or resident 140 devices. Each user profile may be associated with one or more user devices of the respective user.

The device 124 may be a hub device. A controller device also may be a hub device. For example, the hub device 140 may be a hub device. For example, the device 124 may be a smart speaker or a smart digital media player configured to control a television (TV). While the hub device 140 is often inside the primary environment, the user 108 may take the hub device 124 outside the primary environment. For example, the user 108 may take the hub device 124 to their vacation house to stream video or music. In addition, a hub device may be an accessory device. For example, the hub device 124 may be a mobile phone, which can include wireless (e.g., Wi-Fi®) and cellular communication capabilities, multimedia capabilities, and a device assistant.

In some embodiments, the hub device can obtain information about the accessory devices present in the home environment. This information can be obtained by the hub device communicating directly with accessory devices sharing the same network within the home environment. In other embodiments, information about accessory devices can be sent to the hub device by a second hub device, a user device configured as a leader device, or a remote server device (e.g., a service provider). For example, a user in the home may add a new accessory device to the home environment. As part of this process, the user can interact with a second hub device (e.g., a mobile phone) to configure the new accessory device and send the new accessory device information to the first hub device. As another example, a leader device in the home environment can have information about a plurality of accessory devices in the home environment and report information about some or all of the accessory devices to the hub device. The hub device can then use the information to associate with the corresponding accessory devices. The hub device may store the accessory information.

A control device of the controller devices 120 may be any suitable computing device that resides in a particular environment (e.g., primary environment 102) and is configured to control (e.g., provide control instructions) one or more operations or accessory devices in the primary environment 102. In some embodiments, the controller device may transmit one or more messages to (or receive messages from) one or more user devices or accessory devices affiliated with the controller device, as described further herein.

In some examples, a controller device may utilize the LAN 130 to transmit messages to (or receive messages from) other devices of the home environment 102. In some embodiments, a controller device of the controller devices 120 may communicate directly with one or more other devices using any suitable protocol supported by the LAN (e.g., Bluetooth®). In some embodiments, the controller device may communicate with external devices (e.g., the application server 134) utilizing the LAN 130 or the network 132.

In some instances, a controller device (e.g., the hub device 140) may be configured to communicate with the application server 134. In some embodiments, this configuration may include the controller device setting up an account for the home environment. In some embodiments, this account may be maintained (e.g., stored) by the application server 134 or the controller device.

In some embodiments, the controller device is a leader or primary device selected from among the hub devices in the home environment. As used herein, the terms hub device, user device, leader device, primary device, and controller device can indicate one or more similar devices distinguished from the accessory devices.

In some embodiments, a user device (e.g., user device 126) may be any suitable computing device. In a non-limiting example, the user device 126 may be a mobile phone, a tablet, a personal computer, a laptop, a smartwatch, other wearable devices, etc. In some embodiments, the user device 126 may transmit messages to (or receive messages from) one or more other devices in the primary environment 102 via the LAN 130. In some embodiments, the user device 126 may directly communicate with devices in the primary environment 102 using the LAN 130, where the LAN 130 may implement any suitable protocols or combination thereof, such as Bluetooth®, Thread, or Zigbee®.

In some embodiments, the user device 126 may communicate with one or more devices external to the home environment 102 via the LAN 130 or the network 132. In another example, the user device 126 may communicate with external devices (e.g., application server 134) without using the LAN 130 as an intermediary device. For example, when the user device 126 leaves the primary environment 102 (e.g., but is still affiliated with the home environment 102) and is carried on an airplane to another destination. When the user device 126 arrives at the destination, the user device 126 may still receive messages from (or transmit messages to) the application server 134 via the network 132.

In yet another example where the user device 126 is outside the primary environment 102, the user device 126 may transmit messages to (or receive messages from) devices within the primary environment 102, for example, via the LAN 130 and the network 132. For example, the user device 126 may transmit a message over the network 132 that is subsequently routed to a device within the primary environment 102 (e.g., a controller device of the controller devices 120) via the LAN 130. It should be understood that any suitable number or types of user devices may be utilized to perform embodiments of the present disclosure.

The Primary location 160, or home location, is a characteristic associated with the primary or home environment 102. The primary location 160 may be the physical address or geographical location of the primary environment 102. For example, the primary location 160 may be the postal address of the structure 104.

The device that creates the home automation system, e.g., the user device 126, adds the devices and activates the software platform and related applications on those devices. The user device 126 may keep a list of the devices associated with the home automation system. The application detects the physical location of the primary environment 102 and sets it as the primary location 160 of the home automation system. The application may store the primary location 160 of the home automation system in the application server 134. It is understood that the application runs on a device affiliated with the primary environment 102. It is also understood that the application causes a device to send ⁵ messages for conveying information, and the messages are carried through the communication network provided by the LAN 130 and the network 132. For example, the application may extract the primary location 160 from the user's profile, the information from the global positioning system (GPS) of ¹⁰ the user device 126, or the internet protocol (IP) address associated with the LAN 130.

The primary environment 102 is the area associated with the primary location 160 in which a device can connect and join the home automation system. The boundaries and ¹⁵ borders of the primary environment 102 may extend the physical walls and boundaries of the structure 104. The boundaries of the primary environment 102 are referred to as geofence, which is a virtual geographic boundary defined by the coverage of the LAN 130. It is understood that by ²⁰ 'entering' or 'leaving' the primary environment 102, entering or leaving the geofence associated with the LAN 130 is intended.

In some instances, when the user device 126 detects a device associated with the home automation system, e.g., the ²⁵ hub device 124, the user device 126 may associate the connection with the home automation system and the home automation system with the primary environment 102. However, the mismatch between the value of the primary location 160 and the current location of the user device 126, the user ³⁰ device 126, e.g., the application on the user device 126, may conclude that the physical location associated with the home automation system is changed and initiate an updating procedure. A successful update of the updating procedure may cause the home automation system to perform improper ³⁵ operations. An example of an improper operation may be turning on lights when the lights should be off.

In some instances, based on detecting or discovering the hub device 124 may conclude that the user device 126 (and by proxy the user 108) is inside the primary environment ⁴⁰ 102. Based on the determination that the user device 126 is inside the primary environment 102, the user device 126 may send a message to the hub device 140 to inform that the user device 126 (and by proxy the user 108) is inside the primary environment 102, e.g., at home. In response to the ⁴⁵ message from the user device 126, the hub device 140 may perform predefined and configured automation routines or update the primary location 160 of the primary environment 102 with the location associated with the user device 126.

The application may configure restrictions on how spe- ⁵⁰ cific messages are being transmitted. For example, the application may restrict the user device 126 to only use the LAN 130 for transmitting messages related to the primary location 160 and disable sending such messages over the network 132. ⁵⁵

Figure 2:
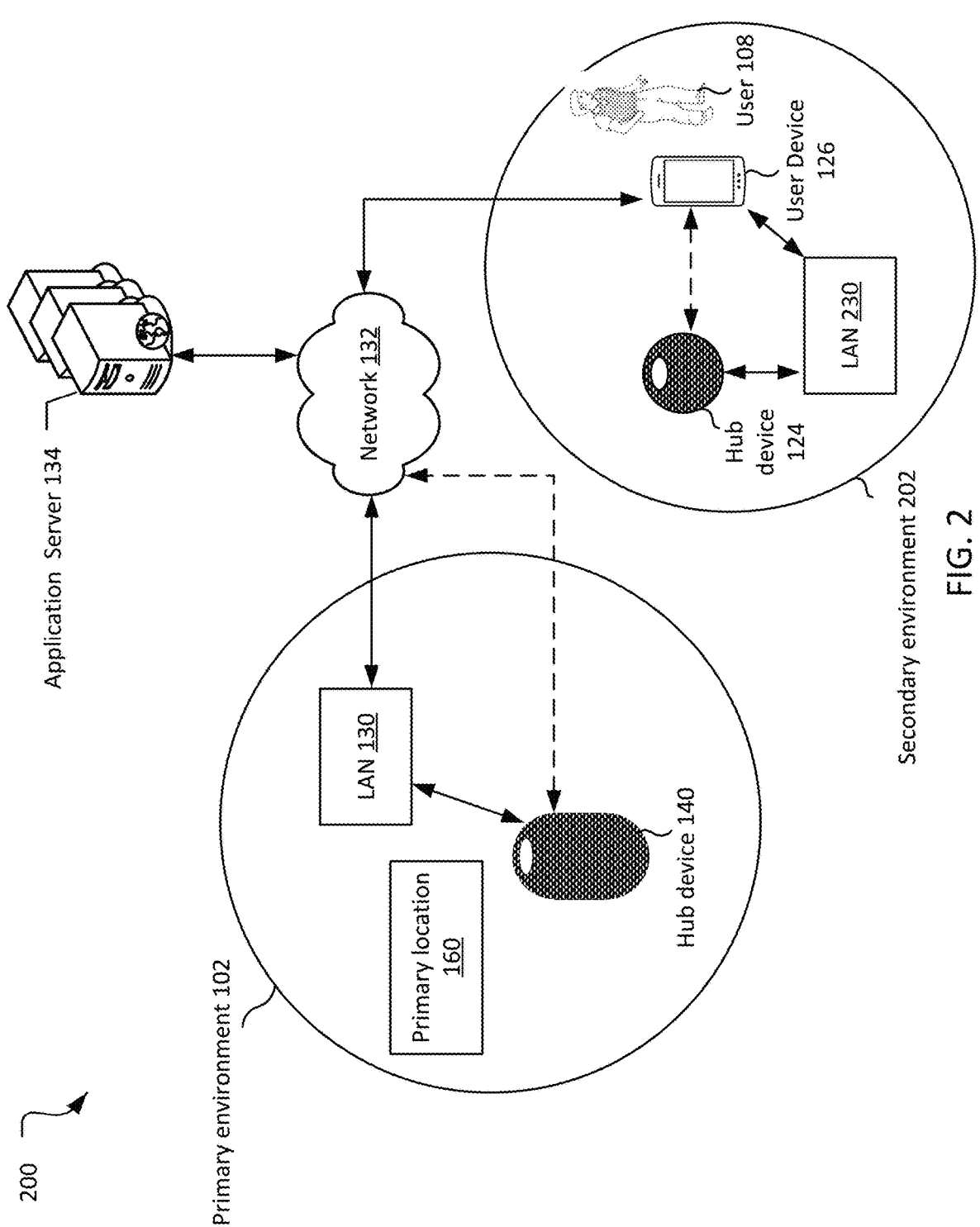
FIG. 2 illustrates a block diagram in accordance with some embodiments

FIG. 2 illustrates a block diagram 200 in accordance with some embodiments. Block diagram 200 is an example of the formation of the secondary environment 202. The primary environment 102, the user 108, the user device 126, LAN 130, the network 132, the application server 134, the hub ⁶⁰ device 140, and the primary location 160 may be similar to the like-named elements shown and described with respect to FIG. 1.

In one instance, the user 108 takes the hub device 124 and the user device 126 to a new location outside the primary ⁶⁵ environment 102, e.g., the secondary environment 202. In the new location, the user 108 plugs in the hub device 124 and the user device 126. The hub device 124 and the user device 126 may discover and connect with the LAN 230. However, the hub device 124 and the user device 126 don't need to discover or connect to the LAN 230 simultaneously or in any specific order. The application associated the secondary location 260 with the secondary environment 202. The hub device 124 is of the home automation system associated with the primary environment 102. For example, the hub device 124 may be the hub device 124, or a device from the devices 110 or 120 in FIG. 1.

The user device 126 may discover or connect with the hub device 124. The user device 126 includes information associating the hub device 124 with the home automation system. The user device 126 may determine that the primary location, also known as the home location, of the home automation system has changed. In one example, the user device 126 may determine that the home automation system's home location is changed based on the value of the primary location 160 and its physical location inside the secondary environment 202. In another example, the user device 126 may determine that the home automation system's home location is changed based on the value of the primary location 160 and its physical location inside the secondary environment 202.

The user device 126 may send a message to the hub device 140 to update the primary location 160 with the physical location of the secondary environment 202. The user device 126, the application of the home automation system running on the user device 126, may associate the physical location of the secondary environment 202 with the location of the user device 126 based on the GPS information or location information associated with the LAN 230.

The home automation application running on the user device 126 may initiate a process to update the home location associated with the home automation system. The process may include generating a message including the physical location of the secondary environment 202 by the user device 126 and sending the message to the hub device 140. The hub device 140 may update the value of the primary location 160 based on the location information in the message it receives from the user device 126.

In one instance, the application may enable or allow the process to update the home location only based on a determination that the LAN 230 and LAN 130 are the same. For example, the user device 126, e.g., the home automation application running on the device 126, may determine that the LAN 130 and the LAN 230 are the same if they have the same service set identifier (SSID), or the IP associated with the gateway of both networks are the same.

In one instance, the application only enables the message related to the update of the home automation system's home location to be sent on the local area network, e.g., LAN 230. In one example, the device 126 may search for the hub device 140 on the LAN 230. In one example, the device 126 may send a discovery message on the LAN 230 to find the hub device 140. The device 126 may send the message to update the home automation system's home location upon successful discovery of the hub device 140. If the device 126 failed to discover the hub device 140, e.g., the discovery was unsuccessful, the application exits the process of updating the home automation system's home location. In another example, the user device 126 sends the message to update the home automation system's home location to the hub device 140 and exits the process to update the home location. However, the LAN 230 protocol may reject the transmission of the message due to the unavailability of the destination on the LAN 230.

FIG. 3 illustrates an operational flow/algorithmic structure 300 in accordance with some embodiments. Flow/algorithm structure 300 is an example of a process for updating the home location of a home automation system. Herein, the process is executed on the user device, e.g., the user device 126 in FIG. 1.

At 304, the user device detects a connection to a first local network in a first location. For example, the first local network may be the LAN 130 in FIG. 1.

At 308, the user device detects a plurality of devices connected to the first local network. The plurality of devices may include controllers, accessories, hub devices, one or more user devices, or the resident device.

At 312, the user device configures a primary location based at least in part on the first location information. For example, the first location information may be the physical location, or the address, of the first location or the GPS location of the user device at the first location.

At 316, the user device detects a second connection of the user device to a second local network at a second location.

At 320, the user device detects the first device. The first device is one of the plurality of devices detected by the user at 308. The user device may receive a beacon from the first device, overhear a transmission from the first device, or discover the first device on the second LAN at the second location. The user may determine, at least in part based on the detection of the first device, that the primary location should be reconfigured with the second location information.

At 324, the user device, at least in part based on the second location information, initiates a process to update the primary location. For example, the user device may determine that the configured primary location is not consistent with the location of the user device at the second location when discovering the first device.

At 328, the user device may restrict the transmission of a primary location update message to a second device of the plurality of devices. For example, such a message can only be transmitted on a local area network using the technology and protocol compatible with the local area network. The user device may also be disabled for using the WAN or the Internet to transmit the location update message.

Figure 4:
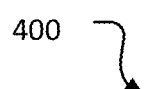
FIG. 4 illustrates an operational flow/algorithmic structure in accordance with some embodiments

FIG. 4 illustrates an operational flow/algorithmic structure 400 in accordance with some embodiments. Flow/algorithmic structure 400 is an example of a process enabling the user device to update the home location of a home automation system. The user device has performed steps 304-316 in FIG. 3.

At 404, the user device determines that the second local network differs from the first local network. For example, the second local network has a different SSID than the first local network, or the second local network has a different gateway IP address than the first local network. Before detecting the second connection, the user device may detect a disconnect from the first LAN.

At 408, the user device enables the initiating updating process in step 324 based on the determination that the first local network is different from the second local network. If the first local network is the same as the second local network, the user device may disable or not initiate the process to update the home location of the home automation system.

Figure 5:
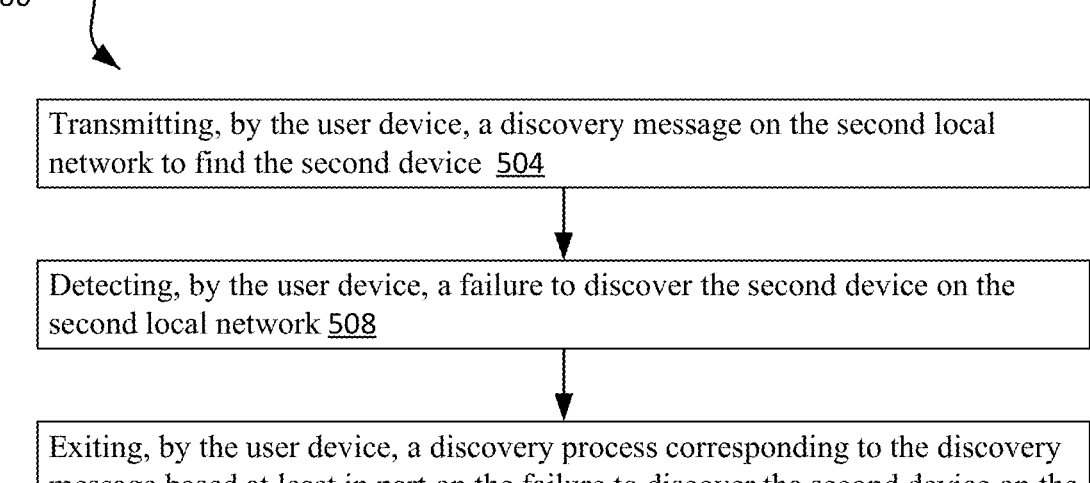
FIG. 5 illustrates an operational flow/algorithmic structure in accordance with some embodiments

FIG. 5 illustrates an operational flow/algorithmic structure 500 in accordance with some embodiments. Flow/algorithmic structure 500 is an example of a process to update a home automation system's home location based on the resident device's detection. The user device has performed steps 304-328 in FIG. 3.

At 504, the user device transmits a discovery message on the second local network to find a second device. The second device may be a resident device, e.g., the hub device 140 in FIG. 1.

At 508, the user device detects a failure to discover the second device on the second LAN. For example, the second device is not connected to the second LAN and may not respond to a discovery message sent by the user device.

At 512, the user device exits the discovery process based at least in part on the failure to discover the second device on the second LAN. The user device may also exit the process to update the home automation system's home location. For example, the discovery of the resident device on the second local network may strongly indicate that the home automation system's home location has moved to the second location, and the primary location of the home automation system needs to be updated.

Figure 6:
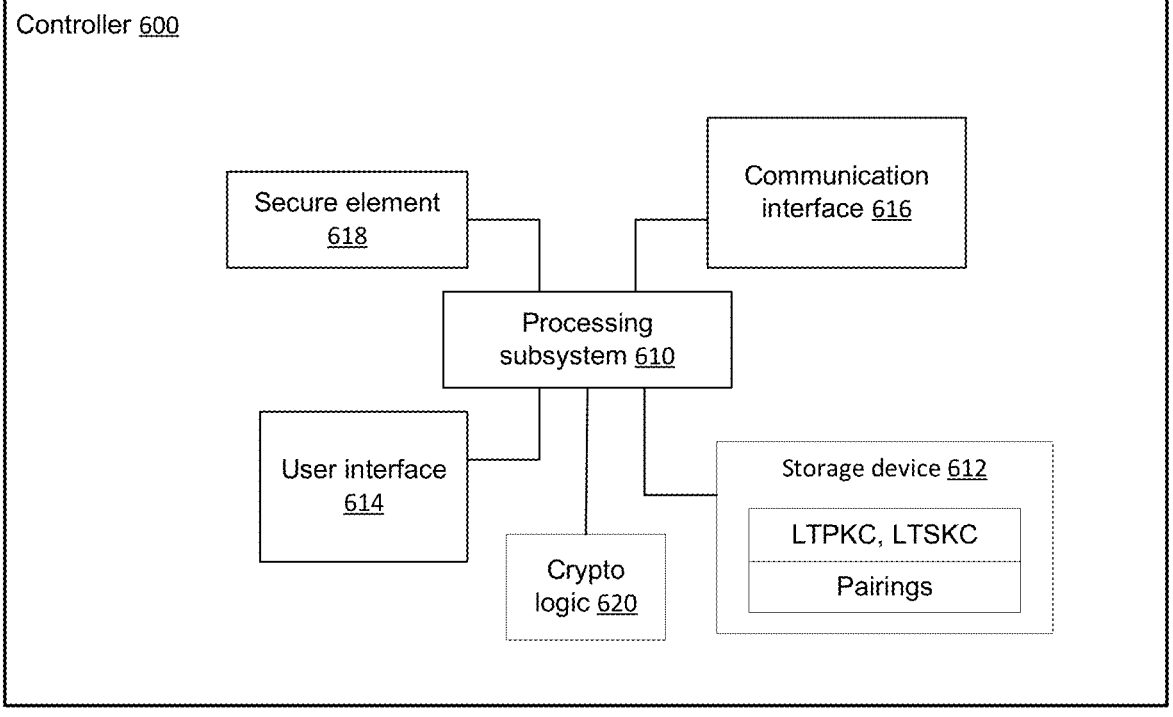
FIG. 6 illustrates a block diagram in accordance with some embodiments

FIG. 6 illustrates a block diagram in accordance with some embodiments. FIG. 6 is a block diagram of a controller 600 according to some embodiments. Controller 600 may be included in a user device, a controller device, a resident device, a hub device, or an accessory device. Controller 600 may implement any or all of the controller functions, behaviors, and capabilities described herein and other functions, behaviors, and capabilities not expressly described.

For example, the application of the home automation system may be executed on the processing subsystem 610, which may cause the communication interface 616 to use the protocol and technology associated with the LAN for transmissions related to updating a primary location.

Controller 600 may include processing subsystem 610, storage device 612, user interface 614, communication interface 616, secure element 618, and cryptographic logic module 620. Controller 600 may also include other components (not explicitly shown), such as a battery, power controllers, and other components operable to provide various enhanced capabilities. In various embodiments, controller 600 may be implemented in a desktop computer, laptop computer, tablet computer, smartphone, wearable computing device, or other systems having any desired form factor. Further, as noted above, controller 600 may be implemented partly in a base station and partly in a mobile unit that communicates with the base station and provides a user interface.

Storage device 612 may be implemented, e.g., using disk, flash memory, or any other non-transitory storage medium, or a combination of media, and may include volatile or nonvolatile media. In some embodiments, storage device 612 may store one or more application or operating system programs to be executed by processing subsystem 610, including computer-executable instructions or programs to implement any or all operations described herein as being performed by a controller. The storage device 612 may include a non-transitory computer-readable medium to store computer-executable instruction or programs. The processing subsystem 610 may include one or more processors configured to access the memory storage 612. For example, storage device 612 may store a uniform controller application that may read an accessory definition record and generate a graphical user interface for controlling the accessory based on the information therein. In some embodiments, portions (or all) of the controller functionality described herein may be implemented in operating system programs rather than applications. In some embodiments, storage device 612 may also store apps designed for specific accessories or specific categories of accessories (e.g., an IP camera app to manage an IP camera accessory or a security app to interact with door lock accessories).

User interface 614 may include input devices such as a touchpad, touch screen, scroll wheel, click wheel, dial, button, switch, keypad, microphone, or the like, as well as output devices such as a video screen, indicator lights, speakers, headphone jacks, or the like, together with supporting electronics (e.g., digital to analog or analog to digital converters, signal processors, or the like). A user may operate input devices of user interface 614 to invoke the functionality of controller 600 and may view or hear output from controller 600 via output devices of user interface 614.

Processing subsystem 610 may be implemented as one or more integrated circuits, e.g., one or more single-core or multi-core microprocessors or microcontrollers, examples of which are known in the art. In operation, processing system 610 may control the operation of controller 600. In various embodiments, processing subsystem 610 may execute programs in response to program code and maintain multiple concurrently executing programs or processes. At any given time, some or all of the program code to be executed may be resident in processing subsystem 610 or in storage media such as storage device 612.

Through suitable programming, processing subsystem 610 may provide various functionality for controller 600. For example, in some embodiments, processing subsystem 610 may implement various processes (or portions thereof) described above as being implemented by a controller. Processing subsystem 610 may also execute other programs to control other functions of controller 600, including programs that may be stored in storage device 612. In some embodiments, these programs may interact with an accessory, e.g., by generating messages to be sent to the accessory or receiving messages from the accessory. Such messages may conform to a uniform accessory protocol as described above.

Communication interface 616 may provide voice or data communication capability for controller 600. In some embodiments, communication interface 616 may include radio frequency (RF) transceiver components for accessing wireless voice or data networks (e.g., using cellular telephone technology, data network technology such as 5G, 4G/LTE, Wi-Fi® (IEEE 802.11 family standards), or other mobile communication technologies, or any combination thereof), components for short-range wireless communication (e.g., using Bluetooth® or Bluetooth® LE standards, NFC, etc.), or other components. In some embodiments, communication interface 616 may provide wired network connectivity (e.g., Ethernet) in addition to or instead of a wireless interface. Communication interface 616 may be implemented using a combination of hardware (e.g., driver circuits, antennas, modulators/demodulators, encoders/decoders, and other analog or digital signal processing circuits) and software components. In some embodiments, communication interface 616 may support multiple communication channels concurrently, using the same transport or different transports.

The secure element 618 may be an integrated circuit or the like that may securely store cryptographic information for controller 600. Examples of information that may be stored within the secure element 618 include the controller's long-term public and secret keys (LTPKC, LTSKC as described above), and a list of paired accessories (e.g., a lookup table that maps accessory ID to accessory long-term public key LTPKA for accessories that have completed a pair setup or pair add process as described above).

In some embodiments, cryptographic operations may be implemented in a cryptographic logic module 620 that communicates with the secure element 618. Physically, cryptographic logic module 620 may be implemented in the same integrated circuit with the secure element 618 or a different integrated circuit (e.g., a processor in processing subsystem 610) as desired. Cryptographic logic module 620 may include various logic circuits (fixed or programmable as desired) that implement or support cryptographic operations of controller 600, including any or all cryptographic operations described above. The secure element 618 or cryptographic logic module 620 may appear as a "black box" to the rest of controller 600. Thus, for instance, communication interface 616 may receive a message in an encrypted form that it cannot decrypt and may simply deliver the message to processing subsystem 610. Processing subsystem 610 may also be unable to decrypt the message, but it may recognize the message as encrypted and deliver it to cryptographic logic module 620. Cryptographic logic module 620 may decrypt the message (e.g., using information extracted from the secure element 618) and determine what information to return to processing subsystem 610. As a result, certain information may be available only within the secure element 618 and cryptographic logic module 620. If secure element 618 and cryptographic logic module 620 are implemented on a single integrated circuit that executes code only from a secure internal repository, this may make extracting the information extremely difficult, providing a high degree of security. Other implementations are also possible.

It is well understood that the use of personally identifiable information should follow privacy policies and practices generally recognized as meeting or exceeding industry or governmental requirements for maintaining users' privacy. In particular, personally identifiable information data should be managed and handled to minimize unintentional or unauthorized access or use risks. In addition, the nature of authorized use should be clearly indicated to users.

Privacy

As described above, one aspect of the present technology is the gathering and use of data relevant to a user's location and associated devices. The present disclosure contemplates that in some instances, this gathered data may include personally identifiable information (PII) data that uniquely identifies or can be used to contact or locate a specific person. Such personal information data can include demographic data, location-based data, telephone numbers, email addresses, Twitter IDs, home addresses, data or records relating to a user's health or level of fitness (e.g., vital sign measurements, medication information, exercise information), date of birth, health record data, or any other identifying or personal or health information.

The present disclosure recognizes that the use of such personal information data, in the present technology, can be used to the benefit of users. For example, the personal information data can be used to provide enhancements to a user's experience with mapping services. Further, other uses for personal information data that benefit the user are also contemplated by the present disclosure The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the U.S., collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of updating the home location of a home automation system, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Flow diagrams, as illustrated herein, provide examples of sequences of various process actions. The flow diagrams can indicate operations to be executed by a software or firmware routine and physical operations. A flow diagram can illustrate an example of the implementation of states of a finite state machine (FSM), which can be implemented in hardware or software. Although shown in a particular sequence or order, the order of the actions can be modified unless otherwise specified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, or data. The content can be directly executable ("object" or "executable" form), source code, or difference code ("delta" or "patch" code). The software content of what is described herein can be provided via an article of manufacture with the content stored thereon or via a method of operating a communication interface to send data via the communication interface. A machine-readable storage medium can cause a machine to perform the functions or operations described and includes any mechanism that stores information in a form accessible by a machine (e.g., computing device, electronic system, etc.), such as recordable/non-recordable media (e.g., read-only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters or sending signals to prepare the communication interface to provide a data signal describing the software content. The communication interface can be accessed via one or more commands or signals sent to the communication interface.

The detailed description refers to the accompanying drawings. The same reference numbers may be used in different drawings to identify the same or similar elements. In the above description, for purposes of explanation and not limitation, specific details are set forth, such as particular structures, architectures, interfaces, or techniques, to provide a thorough understanding of the various aspects of some embodiments. However, it will be apparent to those skilled in the art having the benefit of the present disclosure that the various aspects of the various aspects may be practiced in other examples that depart from these specific details. In certain instances, descriptions of well-known devices, circuits, and methods are omitted so as not to obscure the description of the various aspects with unnecessary detail.

Various components described herein can be a means for performing the operations or functions described. Each component herein includes software, hardware, or a combination. The components can be implemented as software modules, hardware modules, special-purpose hardware (e.g., application-specific hardware, application-specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative and not restrictive sense. The scope of the invention should be measured solely by reference to the claims that follow.

Although the aspects above have been described in considerable detail, numerous variations and modifications will become apparent to those skilled in the art once the above disclosure is fully appreciated. Accordingly, the following claims are intended to be interpreted to embrace all such variations and modifications.

What is claimed is:

1. A method, comprising:

detecting, by a user device, a first connection of the user device to a first local network in a first location;

detecting, by the user device, a plurality of devices connected to the first local network, the user device and the plurality of devices being communicatively coupled at least in part through the first local network;

configuring, by the user device, a primary location associated with the user device based at least in part on first location information;

detecting, by the user device, a second connection of the user device to a second local network in a second location;

detecting, by the user device, that a first device of the plurality of devices is previously connected to the second local network, the user device and the first device being communicatively coupled at least in part through the second local network;

initiating, by the user device, a process to update the primary location associated with the user device based at least in part on second location information associated with the second local network;

determining whether the second location information is associated with the primary location; and in response to determining that the second location information is not associated with the primary location, restricting, by the user device, transmission of a message including a physical location of the user device to a second device of the plurality of devices through the second local network.

2. The method of claim 1, further comprising:

determining, by the user device, that the first local network is different than the second local network; and enabling, by the user device, said initiating based at least in part on the first local network being different from the second local network.

3. The method of claim 1, further comprising:

detecting, by the user device, a disconnect of the first connection of the user device from the first local network before said detecting the second connection.

4. The method of claim 1, further comprising:

transmitting, by the user device, a discovery message on the second local network to find the second device;

detecting, by the user device, a failure to discover the second device on the second local network; and exiting, by the user device, a discovery process corresponding to the discovery message based at least in part on the failure to discover the second device on the second local network.

5. The method of claim 1, further comprising:

transmitting, by the user device, the message including the physical location of the user device to the second device of the plurality of devices through the second local network.

6. The method of claim 1, wherein the primary location is a home location associated with an account corresponding to the user device.

7. The method of claim 1, wherein the first location information is based at least in part on a location of the user device or a location based at least in part on a configuration of the first local network, and wherein the first location differs from the second location.

8. The method of claim 1, wherein said restricting includes a restriction of the user device to use a first transmission technology or a permission to use a second transmission technology.

9. The method of claim 1, wherein the second location information is based at least in part on a location of the user device or a location based at least in part on a configuration of the second local network.

10. The method according to claim 1, wherein the primary location is associated with a predetermined geofence.

11. A non-transitory computer-readable medium storing computer-executable instructions that, when executed by one or more processors of a user device, cause the one or more processors to:

detect, by the user device, a first connection of the user device to a first local network in a first location;

detect, by the user device, a plurality of devices connected to the first local network, the user device and the plurality of devices being communicatively coupled at least in part through the first local network;

configure, by the user device, a primary location associated with the user device based at least in part on first location information;

detect, by the user device, a second connection of the user device to a second local network in a second location;

detect, by the user device, that a first device of the plurality of devices is previously connected to the second local network, the user device and the first device being communicatively coupled at least in part through the second local network;

initiate, by the user device, a process to update the primary location associated with the user device based at least in part on second location information associated with the second local network;

determine whether the second location information is associated with the primary location; and in response to determining that the second location information is not associated with the primary location, restrict, by the user device, transmission of a message including a physical location of the user device to a second device of the plurality of devices through the second local network.

12. The non-transitory computer-readable medium of claim 11, wherein the instructions, when executed, further cause the one or more processors to:

determine, by the user device, that the first local network is different than the second local network; and enable, by the user device, said initiating based at least in part on the first local network being different from the second local network.

13. The non-transitory computer-readable medium of claim 11, wherein the instructions, when executed, further cause the one or more processors to:

detect, by the user device, a disconnect of the first connection of the user device from the first local network before said detecting the second connection.

14. The non-transitory computer-readable medium of claim 11, wherein the instructions, when executed, further cause the one or more processors to:

transmit, by the user device, a discovery message on the second local network to find the second device;

detect, by the user device, a failure to discover the second device on the second local network; and exit, by the user device, a discovery process corresponding to the discovery message based at least in part on the failure to discover the second device on the second local network.

15. The non-transitory computer-readable medium of claim 11, wherein the instructions, when executed, further cause the one or more processors to:

transmit, by the user device, the message including the physical location of the user device to the second device of the plurality of devices through the second local network.

16. A user device comprising:

a memory configured to store computer-executable instructions; and one or more processors configured to access the memory and execute the computer-executable instructions to:

detect, by the user device, a first connection of the user device to a first local network in a first location, detect, by the user device, a plurality of devices connected to the first local network, the user device and the plurality of devices being communicatively coupled at least in part through the first local network;

configure, by the user device, a primary location associated with the user device based at least in part on first location information;

detect, by the user device, a second connection of the user device to a second local network in a second location;

detect, by the user device, that a first device of the plurality of devices is previously connected to the second local network, the user device and the first device being communicatively coupled at least in part through the second local network;

initiate, by the user device, a process to update the primary location associated with the user device based at least in part on second location information associated with the second local network;

determine whether the second location information is associated with the primary location; and in response to determining that the second location information is not associated with the primary location, restrict, by the user device, transmission of a message including a physical location of the user device to a second device of the plurality of devices through the second local network.

17. The user device of claim 16, wherein the one or more processors is further configured to:

determine, by the user device, that the first local network is different than the second local network; and enable, by the user device, said initiating based at least in part on the first local network being different from the second local network.

18. The user device of claim 16, wherein the one or more processors is further configured to:

detect, by the user device, a disconnect of the first connection of the user device from the first local network before said detecting the second connection.

19. The user device of claim 16, wherein the one or more processors is further configured to:

transmit, by the user device, a discovery message on the second local network to find the second device;

detect, by the user device, a failure to discover the second device on the second local network; and exit, by the user device, a discovery process corresponding to the discovery message based at least in part on the failure to discover the second device on the second local network.

20. The user device of claim 16, wherein the one or more processors is further configured to:

transmit, by the user device, the message including the physical location of the user device to the second device of the plurality of devices through the second local network.

* * * * *